Oct. 10, 1961   C. S. ASH   3,003,590
DOUBLE-DISC VEHICLE BRAKE
Filed Oct. 10, 1957   8 Sheets-Sheet 1

INVENTOR.
Charles S. Ash
BY Barthel+Bugbee
Attys

Oct. 10, 1961 C. S. ASH 3,003,590
DOUBLE-DISC VEHICLE BRAKE
Filed Oct. 10, 1957 8 Sheets-Sheet 3

INVENTOR.
Charles S. Ash
BY Barthel + Bugbee
Attys

Oct. 10, 1961  C. S. ASH  3,003,590
DOUBLE-DISC VEHICLE BRAKE
Filed Oct. 10, 1957  8 Sheets-Sheet 4

INVENTOR.
Charles S. Ash
BY Barthel + Bugbee
Attys

Oct. 10, 1961

C. S. ASH 3,003,590

DOUBLE-DISC VEHICLE BRAKE

Filed Oct. 10, 1957

INVENTOR.
Charles S. Ash
BY Carthel + Bugbee
Attys

United States Patent Office 3,003,590
Patented Oct. 10, 1961

3,003,590
DOUBLE-DISC VEHICLE BRAKE
Charles S. Ash, 2220 Wixom Road, Milford, Mich.
Filed Oct. 10, 1957, Ser. No. 689,314
7 Claims. (Cl. 188—73)

This invention relates to vehicle brakes.

One object of this invention is to provide a vehicle wheel brake wherein the braking action is brought about by forcing segmental brake shoes against continuous annular brake discs, thereby exerting a braking action at a given instant against only a fractional part of the circumferential extent of the disc, leaving the remaining part free from any braking engagement for effecting uninterrupted cooling of the thus-exposed brake disc parts, thereby keeping the temperature of the disc at a relatively low point and insuring a high temperature differential between the segmental brake shoes and the segment of the disc being braked, which in turn enhances efficient heat dissipation.

Another object is to provide a vehicle wheel brake of the foregoing character wherein the combination of the segmental brake shoes with the annular brake disc maintains the temperature of the shoes at a lower point than would be the case if continuous annular brake shoes were used, because of the fact that even though a high temperature is generated by the frictional effect of braking, it occurs over a relatively short segment of the disc so that the cooling segment of the disc is greater in circumferential extent than the braking segment with the result that the cooling effect counteracts the heating effect in the portion engaged by the segmental brake shoes.

Another object is to provide a vehicle brake of the foregoing character wherein the brake includes a pair of coaxial annular brake discs which are widely separated from one another and engaged by a pair of correspondingly-spaced segmental brake shoes which are forced axially apart in opposite directions by suitable expanding mechanism, thereby doubling the braking effort while achieving a greatly improved cooling action resulting from the fact that the momentarily unbraked portions of the brake discs are greater in circumferential extent than the braked portions thereof, and also from the fact that because the braking heat is generated at and divided between axially widely separated locations, it is more effectively dissipated at such locations, thereby not only achieving better braking efficiency than prior brakes but also substantially eliminating so-called "brake fade" under all ordinary conditions of driving.

Another object is to provide a vehicle brake of the foregoing character which is relatively inexpensive in first cost, easy to install and service, and equally well adapted to front wheel or rear wheel installation, as well as to hydraulic or mechanical operation.

Another object is to provide a vehicle wheel brake wherein the brake discs are supported by brake supporting members having multiple circumferentially-spaced apertures and wherein the brake discs have integral cooling projections extending outwardly through said apertures, these projections being optionally enlarged therebeyond to serve as retaining means for securing the brake discs to the supporting members.

Another object is to provide a vehicle wheel brake as set forth in the object imediately preceding, wherein the apertures consist of elongated inwardly-directed slot and wherein the brake disc projections consist of elongated fins projecting through said slots for both securing and cooling said brake discs.

Another object is to provide a vehicle wheel brake having axially-spaced arcuate brake shoes engaging axially-spaced annular brake discs in a non-self-energizing relationship, the brake shoes being urged into engagement with their respective brake discs by cams actuated by a fluid pressure motor, the brake shoes engaging only the minor portions of the brake discs at any given instant, the major portions of the discs being exposed to cooling air at that instant.

Other objects and advantages of the invention will become apparent during the course of the following description of the accompanying drawings, wherein.

*General arrangement*

In general, the vehicle brake of the present invention includes a pair of axially-spaced annular discs connected to one another and to the hub of the wheel being braked, a pair of segmental brake shoes mounted inside the annular brake discs, structure for maintaining these segmental brake shoes in approximate alignment while permitting them to move away from or toward one another in braking or unbraking the wheel, and motion-transmitting mechanism for forcing the segmental brake shoes apart in this manner. The segmental brake shoes are faced with heat-resisting brake linings and each segmental brake shoe has a circumferential extent which is less than half of the circumferential extent of the annular brake discs but more than a quarter thereof, a circumferential extent of one-third for the segmental brake shoes being found preferable. This construction results at any given instant in the minor part of each brake disc being subjected to braking action and consequent heat generation, while the remaining unengaged major part of each disc cools and therefore dissipates the braking heat. This construction with its consequently improved cooling action maintains the brake discs and shoes at much lower temperatures than if continuous annular brake shoes are used and at much lower temperatures than are possible with conventional drum type brakes. This construction also substantially eliminates so-called "brake fade." The latter, in conventional drum-type brakes, results from the braking heat causing the brake drum to expand directly and radially outward away from the brake shoes, thereby widening the clearance therebetween and thus rapidly reducing braking efficiency. In disc-type brakes, however, the heated disc expands rapidly but in a direction parallel to the friction surface of the brake shoe so that the clearance is relatively unaffected and the efficiency not so much impaired. The brake construction of the present invention also achieves better braking efficiency than prior brakes, and results in a mechanical simplicity which renders it low in manufacturing cost and easy to install and service.

*Brake installation construction as mounted on rear wheel*

Figures 1, 13:
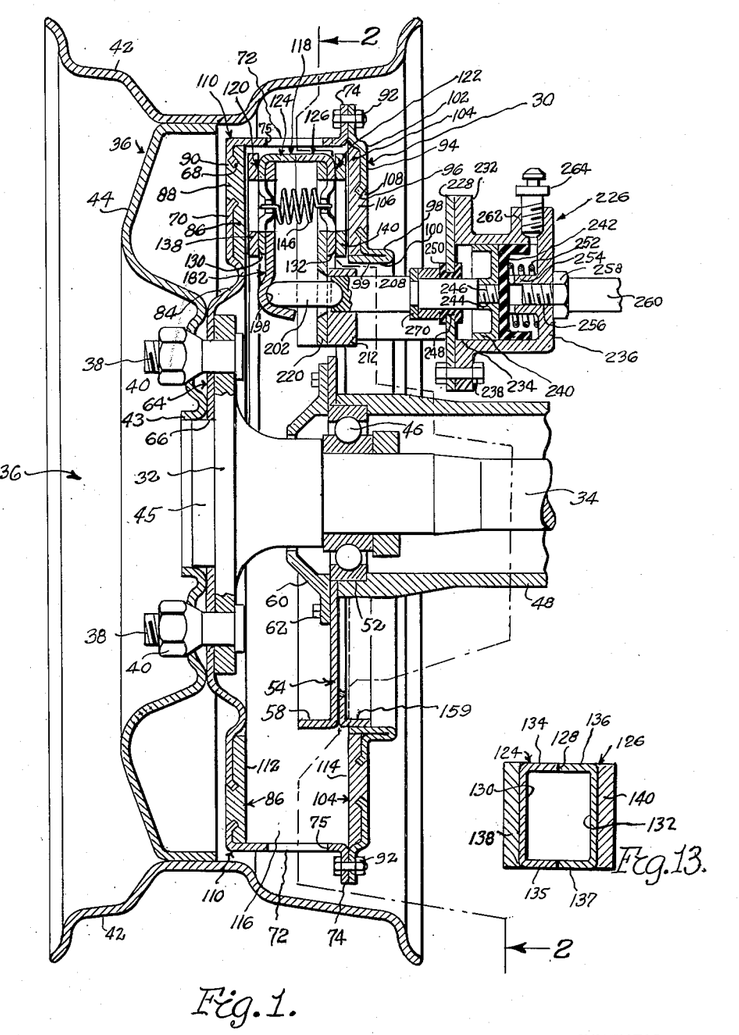
FIGURE 1 is a central vertical axial section through a double-disc vehicle brake with double segmental brake shoes, taken along the line 1—1 in FIGURE 2, according to one form of the invention.
FIGURE 13 is a cross-section through the brake shoe assembly, taken along the line 13—13 in FIGURE 2.
Figures 2, 3, 4, 5:
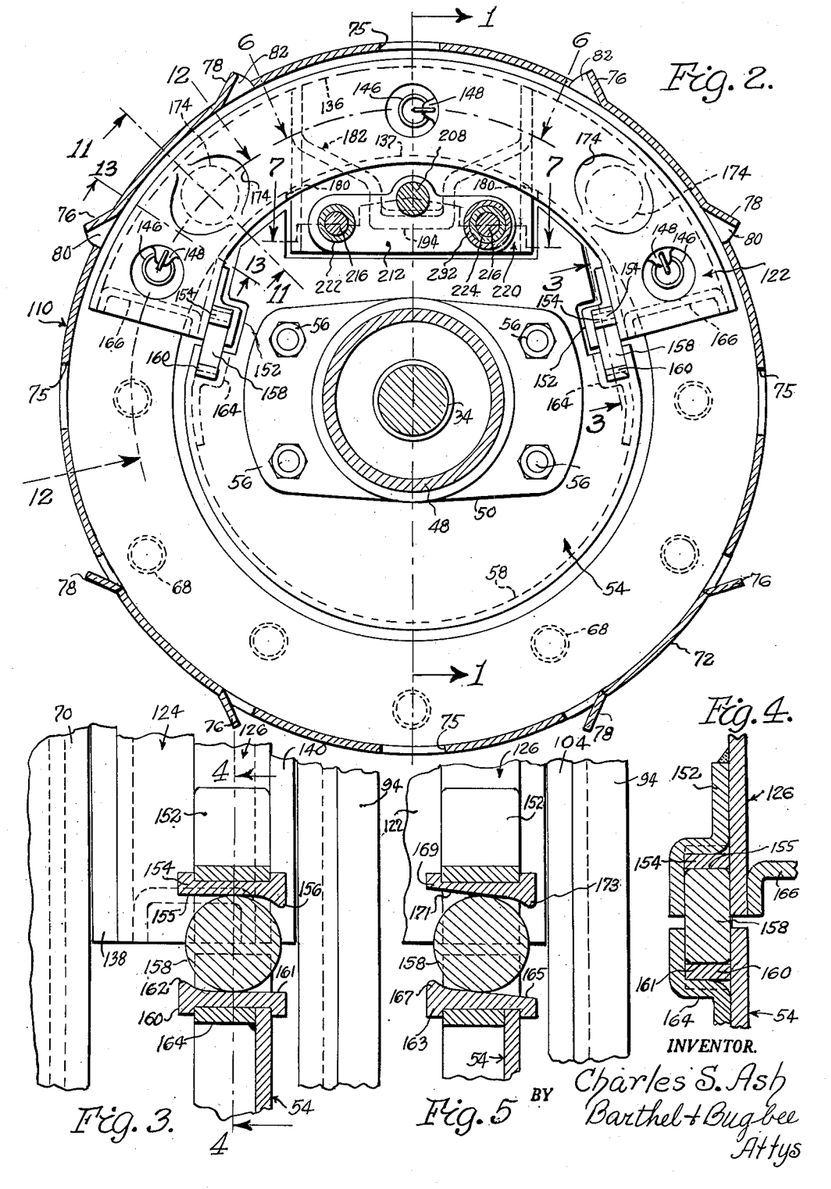
FIGURE 2 is a central vertical radial section taken along the zigzag line 2—2 in FIGURE 1.
FIGURE 3 is a fragmentary approximately vertical axial section taken along the line 3—3 in FIGURE 2.
FIGURE 4 is a fragmentary radial section taken along the line 4—4 in FIGURE 3.
FIGURE 5 is a fragmentary section similar to FIGURE 3, but of slightly modified construction.
Figures 16, 27, 28, 29:
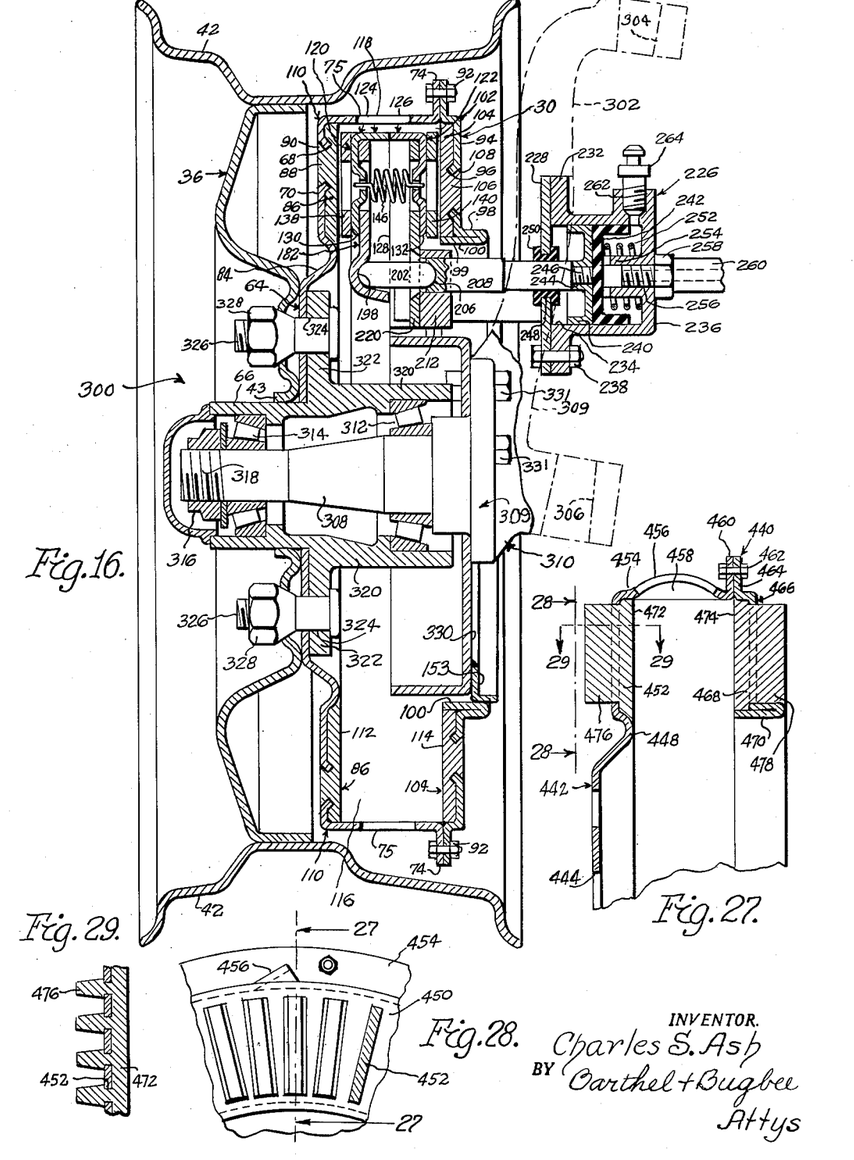
FIGURE 16 is a central vertical longitudinal section through the vehicle brake of FIGURE 2, as applied to a front wheel of a motor vehicle.
FIGURE 27 is a fragmentary vertical section taken along the line 27—27 in FIGURE 28 through a pair of spaced annular brake discs similar to those shown in FIGURE 16, but carried by brake supporting members having multiple circumferentially-spaced apertures engaged by corresponding projections extending outwardly from the brake discs through the apertures.
FIGURE 28 is a fragmentary left-hand side elevation of the construction shown in FIGURE 27, taken along the line 28—28 therein.
FIGURE 29 is a fragmentary horizontal section taken along the line 29—29 in FIGURE 27.

Referring to the drawings in detail, FIGURES 1 to 15 inclusive (excluding the slight modifications of FIGURES 5 and 13) show a double-disc segmental-shoe vehicle brake installation, generally designated 30, according to one form of the invention, which can be interchangeably mounted upon the bolting flange of either of the rear axle (FIGURE 1) or front hub (FIGURE 16). FIGURE 1 shows the brake installation 30 mounted upon the bolting flange 32 of a conventional rear axle 34 to which a vehicle wheel, generally designated 36, is secured, as by the bolts or studs 38 and nuts 40 threaded thereon. The wheel 36 (only the rim 42 and disc 44 of which are shown) is conventional and at its central flanged apertured portion 43 engages the end portion 45 of the axle 34. The wheel 36 and the rear axle 34 and their details are beyond the scope of the present invention. For the purposes of the present invention, it will suffice therefore to say that the axle 34 is mounted on a suitable anti-friction bearing assembly 46 within a tubular rear axle housing 48 (FIGURE 1). The rear axle housing 48 has an approximately rectangular horizontally-elongated end plate 50 thereon which is internally-bored at 52 to receive the outer race of the anti-friction bearing assembly 46. Secured to the end plate 50, as by the bolts 56, is a stationary approximately disc-shaped brake-shoe-supporting or anchor plate 54 having an outwardly-projecting flange 58 extending slightly more than halfway around the lower edge thereof (FIGURE 2). An approximately annular bearing retaining cap and lubricant seal 60 is secured as at 62 to the axle end plate 50 (FIGURE 1) and retains the anti-friction bearing assembly 46 in position while excluding dust and other foreign matter and retaining lubricant therein.

Also secured to the bolting flange 32 by the bolts 38 and nuts 40 and held in place thereagainst by the wheel disc 44 is an annular brake disc supporting plate 64 having a central opening 66 encircling the axle end portion 45. The supporting plate 64 has indented brake disc securing apertures 68 disposed at intervals around the circumference of its radial portion 70, and at its periphery has an annular axially-extending portion 72 terminating in a radial flange 74. The axial portion or rim 72 is provided with diametrically-opposite aperture 75 arranged at 90° intervals (FIGURE 2) for convenience of handling, and also with struck-up cooling fins and air deflectors 76 and 78 extending upwardly in opposite directions from the apertures 80 and 82 respectively in the rim portion 72 of the supporting plate 64. The radial portion 70 of the supporting plate 64 is provided with an annular inwardly-extending indentation rib 84 (FIGURE 1) for supporting the inner edge of an outer annular brake disc 86 which is preferably of pearlitic or close-grained cast iron. The latter has been found resistant to scoring and is cast against the inner face of the radial disc portion 70 between the annular rib 84 and the rim 72 (FIGURE 1) with anchor portions or bosses 88 extending through the holes 68 with their outer ends enlarged as at 90 to anchor the outer annular brake disc 86 firmly and solidly in place, so that it rotates as a unit with the brake supporting disc 64. When the cast iron cools, it shrinks or contracts and thereby clinches the parts tightly together through the action of the bosses 86 described above and the bosses 106 described below.

Bolted as at 92 to the radial flange 74 on the inner end of the rim 72 of the brake disc supporting plate 64 is an inner annular brake disc supporting ring 94 likewise having indented apertures 96 therein similar to the apertures 68 and also having reversely-bent double-flanges 98 and 99 surrounding its inner opening 100. Mounted in the space between the inner flange 99 and a rib 102 formed in the ring 94 is an inner annular brake disc 104. The latter is cast into the space just described in a manner similar to the outer brake disc 86 and similarly has bosses 106 projecting through the holes 96 and having enlarged anchorage portions 108 resulting from the indented shape of the holes 96. In this manner, as seen at the lower portion of FIGURE 1, there is provided a double annular brake disc unit, generally designated 110, including the brake disc supporting plate 64, the brake disc supporting ring 94 and the outer and inner brake discs 86 and 104. This unit 110 thus provides axially-spaced parallel outer and inner braking surfaces 112 and 114 respectively on the facing sides of the outer and inner annular brake discs 86 and 104 respectively. It will be observed that the opening 100 which is encircled by the inner flange 99 is of slightly greater diameter (FIGURE 1) than the outer diameter of the flange 58 on the brake shoe supporting plate 54 so that the brake disc unit 110 may be withdrawn to the left (FIGURE 1) past the flange 58 without interference therefrom or therewith, as explained below in connection with the operation of the invention.

Figures 14, 15:
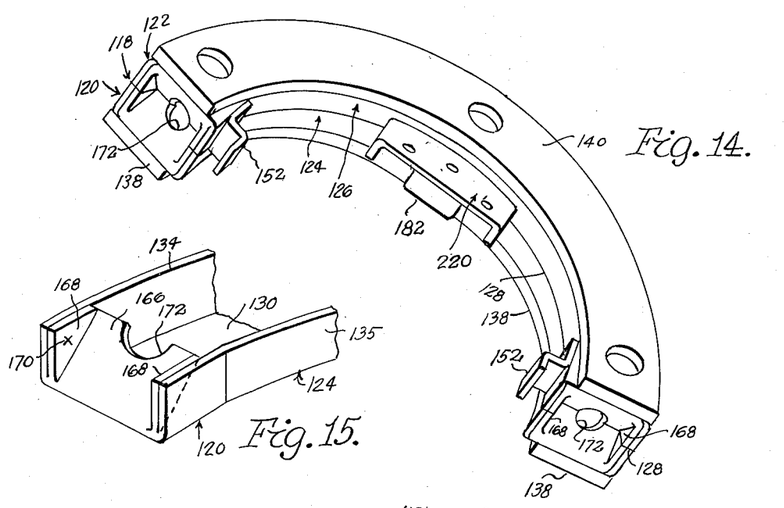
FIGURE 14 is a bottom perspective view of a brake shoe assembly used in the brake of FIGURES 1 and 2.
FIGURE 15 is a fragmentary perspective view of the left-hand end of the rearward brake shoe shown in the lowermost position in FIGURE 14.

Mounted in the upper portion of the double annular brake disc unit 110 in the space 116 between the opposite braking surfaces 112 and 114 and the rim portion 72 is a double segmental brake shoe assembly, generally designated 118, and including master and slave or rearward and forward or inner an outer brake shoe units 122 and 120 respectively of channel cross-section facing toward one another (FIGURES 1, 2 and 14). In the assembly 118, the arcuate outer and inner brake lining supporting members 124 and 126 are also of channel cross-section (FIGURE 13) and engage one another upon a common junction line 128. The outer and inner brake lining supporting members 124 and 126 have parallel radial portions 130 and 132 respectively (FIGURE 1) and axially aligned outer flanges 134 and 136 coaxial with inner flanges 135 and 137 respectively (FIGURE 13). Secured to the outer faces of the radial portions 130 and 132 are outer and inner brake linings 138 and 140 respectively of arcuate segmental form and of conventional heat-resisting brake lining material such as, for example, one of the asbestos-containing brake lining known to those skilled in the brake lining art. The composition of the brake lining itself forms no part of the present invention.

Figure 6:
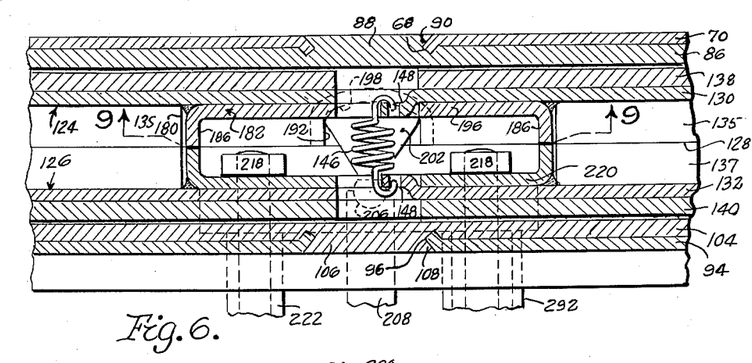
FIGURE 6 is a fragmentary approximately horizontal section taken along the arcuate line 6—6 in FIGURE 2.

The outer and inner brake linings 138 and 140 have flat faces 142 and 144 respectively engageable with the corresponding flat surfaces 112 and 114 of the outer and inner brake discs 86 and 104, and are urged toward one another by short tension springs 146, the opposite ends of which are hooked into drilled struck-up lugs 148 and 150 respectively (FIGURES 1 and 6). In order to anchor the inner or master brake shoe unit 122 against circumferential motion while permitting axial braking motion thereof, approximately Z-shaped angle members 152 are welded or otherwise secured thereto near the opposite ends thereof for the purpose of supporting the double segmental brake shoe assmbly 118. Secured to the angle members 152 are hardened wear or bearing bars 154 provided with generally straight parallel bearing surfaces 155, the major part of their lengths. The bars 154 (FIGURE 3) are secured as by welding or in any other suitable manner and have a stop projection 156 at one end thereof. Engaging each of the bearing bars 154 is the upper periphery of a roller 158, the lower periphery of which engages a bearing bar 160 provided with a parallel bearing surface 161 terminating in a stop projection 162 at the opposite end thereof from the stop projection 156 on the bearing bar 154. The bearing bars 160 are secured to and rest upon approximately Z-shaped supporting members 164 (FIGURE 3) which in turn are welded or otherwise secured to the brake shoe supporting plate or anchor plate 54 and to its flange 58. The rollers 158 receive and transmit the braking force to the anchor plate 54 by way of the members 164. A sealing member 159 of angle cross-section is secured to the anchor plate 54 (FIGURE 1) with its flange extending in the opposite direction to the flange 58 but in approximate alignment therewith, in order to prevent dirt from entering between it and the opening 100 of the reversely-bent flange 99.

The slightly modified construction of FIGURE 5 provides for a slight circumferential motion of the master brake shoe until 122 to produce an additional servo force. For this purpose, the generally straight bearing bars 154 and 160 of FIGURE 3 are replaced by wedge-shaped bearing bars 163 and 169 having oblique or inclined surfaces 165 and 171 terminating in stop projections 167 and 173 giving a downhill rolling action on the roller 158. As a result of either construction, the inner arcuate or segmental brake shoe unit 122 is rollably supported at its opposite ends so as to move back and forth toward and away from the corresponding brake shoe unit 120 while maintaining a spaced parallel relationship therewith. The downhill action of the modified FIGURE 5 construction additionally tends to urge the inner brake shoe assembly 122 to the right into engagement with its respective inner brake disc 104.

The opposite ends of the brake lining supporting members 124 and 126 are reinforced by a bent end construction shown in FIGURE 15, wherein an extension 166 of the wall 130 or 132 is bent into the channel thereof at approximately 45° and tabs 168 are bent perpendicularly thereto and spot-welded as at 170 to the flanges 134 and 135 or 136 and 137, as the case may be. Holes 172 are provided in the opposite ends of the double-segmental brake shoe assembly 118 for circulation of cooling air. Intermediate their ends and centers, the brake lining supporting members 124 and 126 are provided with partially spherical ball seats 174 and 176 respectively between which are mounted motion-transmitting balls 178. The brake shoe units 120 and 122 are interconnected only by the springs 146 and the rolling engagement of the balls 178 with their respective seats 174 and 176 so as to provide a self-energizing action, as explained below in connection with the operation of the invention. The brake shoe unit 122 is a master unit and the brake shoe unit 120 a slave or follower unit which comes into action in response to the braking engagement of the master unit 122, as also explained below, by an arcuate sliding of the units 120 and 122 parallel to one another with a motion analogous to a shearing motion. When this occurs (FIGURE 12), the ball 178 will ride up on the edges of the ball seats 174 and 176, thrusting the brake lining supporting member 126 away from the corresponding member 124 and applying the braking action, as explained below. The slightly modified construction of FIGURE 12A adds to FIGURE 12 flanged ball seat inserts or wear members 171 and 173 with opposed concave ball seat surfaces 175 and 177 and inserted in flanged holes 179 and 181 in the brake shoe supporting members 124 and 126.

Secured to the side wall 130 of the slave brake lining supporting member 124, as by welding, and extending radially inward through a gap 180 (FIGURES 2 and 6) in the inner flange 135 thereof is a thrust-receiving arm or forward bracket 182 (FIGURES 9 and 10) having an arcuate upper edge 184 and parallel side flanges 186 converging toward one another as at 188 into a portion 190 having parallel side walls 192 and a connecting wall 194. The walls 192 and 194 are configured to form, with the main wall 196 (FIGURE 10) an elongated trough-shaped socket 198 of arcuate cross-section in a radial direction. Rollably engaging the socket 198 is the correspondingly configured arcuate end 200 (FIGURE 7) of a fan-shaped motion-transmitting member 202, the smaller or inner end of which is provided with a ball 204. The latter engages a correspondingly-shaped approximately hemispherical socket 206 in the end of a reciprocable motion-transmitting rod 208 which is reciprocable in a bore 210 in an elongated block 212.

The block 212 is bored with parallel holes 214 (FIGURE 7) for the passage of the inner end portions of bolts 216 which are threaded into nuts 218 welded or otherwise secured to a flanged bracket 220 rising therefrom. The bracket 220 extends upward and is welded or otherwise secured (FIGURE 6) to the brake lining supporting member 126, so as to move unitarily therewith axially during application of the brake, as explained below in connection with the operation of the invention. Also mounted on the bolts 216 and spaced away from the block 212 by tubular spacers 222 and 224 (FIGURE 7) is a reciprocatory hydraulic brake-operating motor, generally designated 226.

The hydraulic motor 226 consists of an end plate 228 and a cylinder 230 with an end flange 232 and a cylinder bore 234 terminating at an opposite end wall 236. The end plate 228 and cylinder flange 232 are bored for the passage of the bolts 216 and are also additionally bored to receive independent bolts 238 (FIGURE 1). Reciprocably mounted in the cylinder bore 234 is a piston head 240 with a cup-shaped resilient member 242 seated thereagainst to prevent leakage past the piston head 240. The piston head 240 is bored and threaded to provide a socket 244 into which the correspondingly threaded reduced diameter end 246 of the rod 208 is threaded. The end plate 228 is provided with an aperture 248 surrounding the rod 208 and equipped with a resilient gasket 250.

The piston head 240 and rod 208 are urged to the left (FIGURE 1) by a helical compression spring 252 which maintains these parts in engagement without rattling, when the cylinder 230 is not under hydraulic pressure. The spring 252 encircles a tubular boss 254 on the inner side of the cylinder end wall 236, and the bore 256 therethrough is threaded to receive a correspondingly-threaded coupling 258 for a flexible hydraulic pressure fluid service pipe 260. The bore 256 thus serves as a pressure fluid inlet and discharge port for the single-acting hydraulic piston head 240. The cylinder 230 adjacent the wall 236 is also provided with a threaded port 262 into which is threaded a conventional pressure relief valve, generally designated 264.

In order to operate the brake unit 30 manually independently of its hydraulic motor 226, such as for parking or emergency purposes, the manual brake-operating mechanism, generally designated 266 (FIGURE 7) is employed. It can be applied either to the front or rear wheel brakes, its application to the latter being simpler and cheaper, as not requiring turning for steering. For this purpose, the rod 208 is grooved as at 268 to receive a thrust washer or ring 270 and the latter is engaged by the yoked rounded end portions 272 of the welded-together inner arms 274 and 275 of a bellcrank lever 276 (FIGURES 7 and 8), the outer arm 278 of which is pivotally connected at 280 to a clevis 282 to which is connected an operating rod 284 leading to a conventional manual brake-operating mechanism, such as a hand lever, or to a conventional power-assisted mechanism for operating the brake mechanically, rather than hydraulically. The bellcrank lever arms 274 and 275 have arcuate bends 277 and 279 collectively forming a loop 286 which is provided with rounded fulcrums 288 rockably engaging the end plate 228 (FIGURE 7) and which has an enlarged hole 290 encircling the tubular spacer 224. In order to limit the motion of the fulcrum portion or hub 286 of the bellcrank lever 276 along the tubular spacer 224, a shortened supplementary tubular spacer 292 is mounted on the tubular spacer 224 so that its end acts as a stop limiting axial motion of the lever hub 286 away from the end plate 228 upon which its fulcrum portion 288 rocks.

*Front-wheel brake installation*

FIGURE 16 shows the manner in which the double-disc segmental shoe brake installation 30 is applied to a conventional front wheel assembly, generally designated 300. The brake installation 30 itself remains substantially unchanged from that shown in FIGURES 1 to 15 inclusive, and differs in the manner in which it is supported. The front wheel assembly 300 has the usual yoke portion 302 by which it is connected to the front-wheel suspension in the usual way (not shown) and thence to the conventional front axle (also not shown). The yoke portion 302 in an older type of front wheel suspension would receive the formerly standard kingpin in the upper and lower holes 304 and 306, and in the more modern parallel link suspension would receive the usual connections thereto. These suspensions are well-known to automotive engineers and their details accordingly form no part of the present invention.

The yoke portion 302 is integral with or connected to the usual wheel spindle 308 at their enlarged junction portion 309, together forming the front wheel spindle unit 310. The wheel spindle 308 supports the usual axially-spaced tapered roller bearing assemblies 312 and 314 held in place by a nut and washer unit 316 mounted on the threaded end portion 318. Rotatably mounted on the roller bearing assemblies 312 and 314 is a hollow tubular hub 320 having a radial wheel-mounting flange 322 provided with holes 324 for the reception of the bolts or studs 326 and nuts 328 corresponding to the bolts 38 and nuts 40 of the rear wheel assemblies shown in FIGURE 1. Bolted to the flange 322 by the bolts 326 and nuts 328 is a wheel 36 which is of course interchangeable with and identical with the wheel 36 of FIGURE 1, corresponding parts therefore bearing the same reference numerals.

In order to support the brake installation 30, the front wheel installation 300 is provided with a rearward flanged brake unit supporting plate 330 and the previously-described forward brake unit supporting plate 64. The rearward plate 330 is secured by bolts 331 to the enlarged portion 309 of the front wheel spindle 308 and yoke portion 302, so as to be capable of swinging unitarily with the front wheel spindle unit 310. The forward brake supporting plate 64 is, as in FIGURE 1, secured to the flanged portion 322 by the same bolts and studs which secure the wheel 36 thereto. The brake installation 30 at its rearward side is supported in the same manner as shown at 152 to 164 inclusive, in FIGURES 2 and 4 on the flanged brake unit supporting plate 330 and hence requires no additional description.

*One-piece stamped brake shoe supporting segments and brackets*

Figures 17, 18, 19, 20, 21, 22:
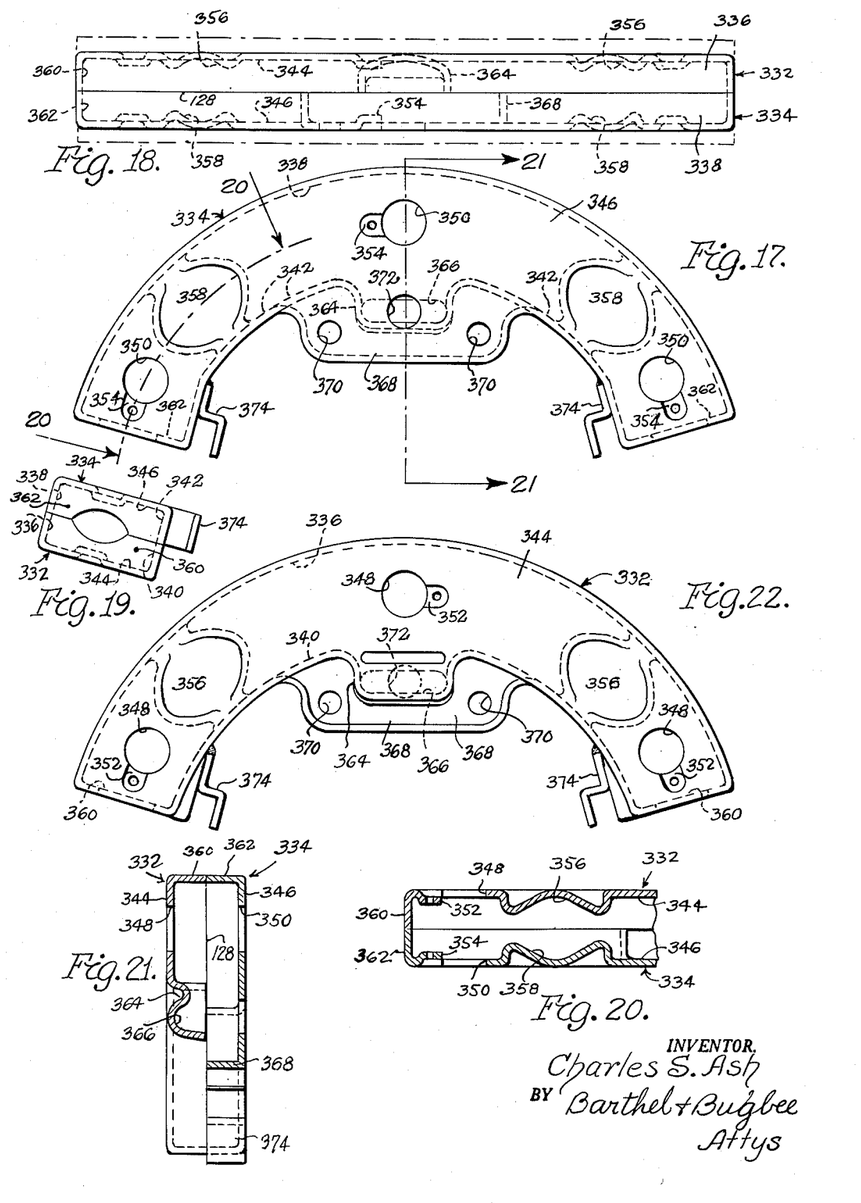
FIGURE 17 is a front elevation of a pair of one-piece stamped brake shoes, constituting a modification of the built-up segmental brake shoes of FIGURES 1 and 2, with the segmental brake linings removed for clarity of showing.
FIGURE 18 is a top plan view of the pair of brake shoes shown in FIGURE 17.
FIGURE 19 is a bottom plan view of the left end of the brake shoe assembly shown in FIGURE 17.
FIGURE 20 is a fragmentary approximately vertical section taken along the arcuate line 20—20 in FIGURE 17.
FIGURE 21 is a vertical cross-section taken along the line 21—21 in FIGURE 17.
FIGURE 22 is a rear elevation of the brake shoe assembly shown in FIGURES 17 and 18.

FIGURES 17 to 22 inclusive show arcuate segmental outer and inner brake lining supporting members, generally designated 332 and 334 respectively. These members 332 and 334 perform the same functions as the members 124 and 126 of FIGURES 1 and 14, and also of their respective brackets 182 and 220, but in one-piece construction. The members 332 and 334 are preferably formed from sheet metal in a stamping press as stampings with outer edge flanges 336 and 338, inner edge flanges 340 and 342, and connecting webs 344 and 346 respectively (FIGURE 19). The webs 344 and 346 are provided with the holes 348 and 350, spring connection lugs 352 and 354, and ball seats 356 and 358 coresponding to the similar parts shown in FIGURES 1, 2, 6 and 12 to 15 inclusive, and in addition have perpendicular abutting end walls 360 and 362 respectively (FIGURE 20). The central portion of the brake lining supporting member 332 has a downwardly-extending forward bracket portion 364 integral therewith and likewise integrally flanged therewith. The downwardly-extending forward bracket portion 364 is provided with an elongated trough-shaped socket 366 of arcuate cross-section corresponding to the socket 198 of the separate forward bracket 182 (FIGURES 9 and 10) which in FIGURE 1 is welded to the forward brake lining supporting member 124. The socket 366, as in the case of the socket 198 of FIGURE 1, receives the arcuate end 200 of the fan-shaped motion-transmitting member 202 (FIGURE 7) as described in connection with FIGURE 7.

Figures 7, 8, 9, 10, 12A:
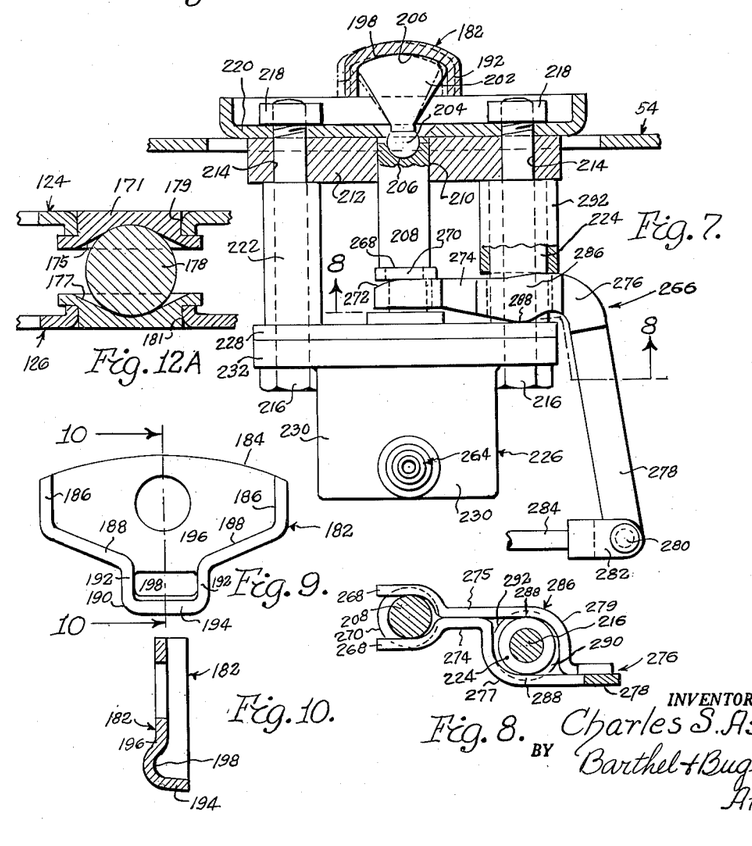
FIGURE 7 is a fragmentary approximately horizontal section taken along the zigzag line 7—7 in FIGURE 2.
FIGURE 8 is a fragmentary vertical section taken along the line 8—8 in FIGURE 7.
FIGURE 9 is a front elevation of one of the segmental brake shoe actuators looking along the line 9—9 in FIGURE 6.
FIGURE 10 is a vertical section taken along line 10—10 in FIGURE 9.
FIGURE 12A is a fragmentary cross-section of a slight modification of FIGURE 11, taken along a similar section line.

The rearward brake lining supporting member 334, on the other hand, is also provided at its central portion with an integral downwardly-extending flanged rearward bracket portion 368 which, as in the case of the separate rearward bracket 220 of FIGURES 1, 2 and 7, also supports the block 212 and the hydraulic brake operating motor 226 in a manner similar to that shown in FIGURE 7 and hence requiring no additional description. The bolt holes 370 and the central hole 372 are for the passage of the bolts 216 and ball 204 of the fan-shaped motion-transmitting member 202 shown in FIGURE 7. Welded to the inner flanges 342 of the rearward brake lining supporting member 334 near the opposite ends thereof are two approximately Z-shaped angle members 374 similar in construction to the corresponding angle members 152 of FIGURES 2 and 14 and for the same purpose of movably supporting the rearward brake shoe unit 122 employing the one-piece rearward brake lining supporting member 334.

*Modified double-disc segmental-shoe brake installation construction*

Figures 23, 26:
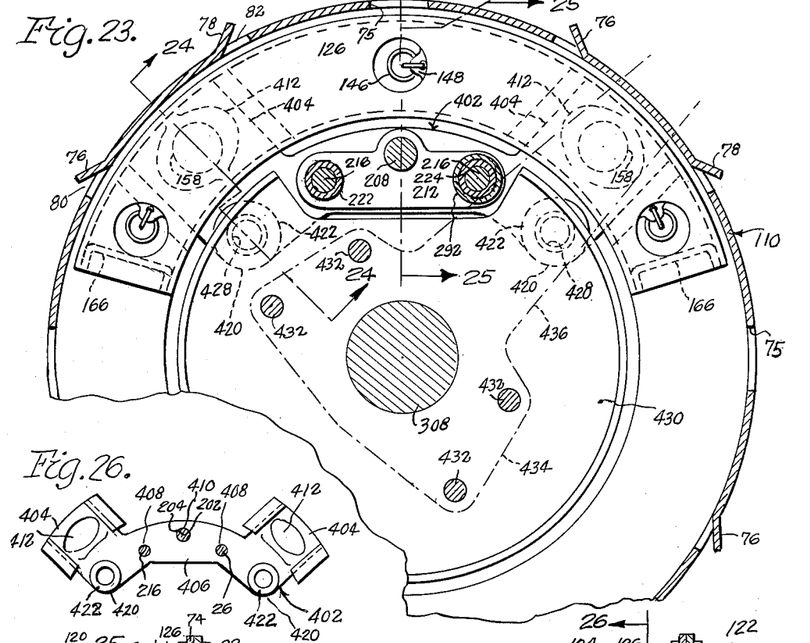
FIGURE 23 is a radial section similar to FIGURE 2 but of a modification thereof employing different means of guidance for the oppositely-moving segmental brake shoes than that employed in FIGURE 2.
FIGURE 26 is a side elevation of a bracket used in the modification of FIGURES 23 to 25 inclusive, looking in the direction of the line 26—26 in FIGURE 24.
Figures 24, 25:
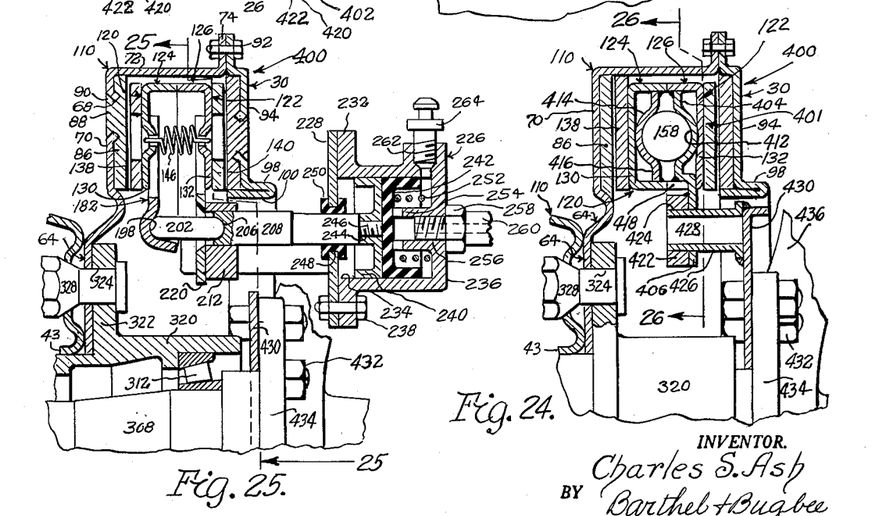
FIGURE 24 is a fragmentary inclined cross-section taken along the zigzag line 24—24 in FIGURE 23.
FIGURE 25 is a fragmentary vertical cross-section taken along the line 25—25 in FIGURE 23.

The modified double disc segmental-shoe vehicle brake installation, generally designated 400, shown in FIGURES 23 to 25 inclusive, is generally similar to the brake installation 30 of FIGURES 1 and 16 and, like FIGURE 16, is shown as applied to a front wheel brake installation, but has a different manner of reciprocably supporting the rearward brake shoe unit, generally designated 401, which differs somewhat in construction from the rearward brake shoe unit 122 of FIGURE 1, although having a brake lining supporting member 126 of similar construction. The brake shoe units 120 and 401 are otherwise of similar construction to the brake shoe units 120 and 122 shown in FIGURES 1 and 16, with the exception of the fact that the rearward bracket 220 of FIGURES 1 and 16 is replaced by an approximately W-shaped bracket, generally designated 402 (FIGURE 26) which serves several different purposes. The bracket 402 has upwardly-inclined arms 404 interconnected by a central or bridge portion 406 with bolt holes 408 therein for the passage of the bolts 216 (FIGURE 7) and a central hole 410 for the passage of the ball 204 in the fan-shaped member 202 of FIGURE 7. The arms 404 near their upper ends are provided with concave portions 412 forming ball seats, the opposite seats 414 (FIGURE 24) being formed in rectangular plates 416 welded into the channel of the forward brake lining supporting member 124. The ball seats or upper portions of the arms 404 are likewise welded into the channel of the rearward brake lining supporting member 126, and the arm 404 extends downwardly through a cutaway portion 418 in the lower flange of the member 126.

In its lower corner portion 420, each arm 404 has welded or otherwise secured to it a bearing sleeve 422 (FIGURE 24) with a bearing bore 424 and is bored in alignment therewith to slidably engage the outer or bearing surface 426 of a tubular flanged stem 428. The latter is welded or otherwise secured to a stationary flanged supporting plate 430 which in turn is bolted as at 432 to the hub 434 of the front axle suspension connection arm 436. The latter, like the yoke portion 302 in the upper right-hand corner of FIGURE 16, is conventional and is connected to conventional suspension mechanism beyond the scope of the present invention, and exists in many varieties well-known to those skilled in the automotive art. The remainder of the front axle spindle unit is substantially the same as that shown in FIGURE 16, together with its accompanying parts, and similar elements accordingly bear the same reference numerals.

*Operation*

The operation of the double-disc segmental brake installation of the invention, whether the installation 30 of FIGURES 1 to 16 inclusive, or equipped with the one-piece brake lining supporting members of FIGURES 18 to 22 inclusive, or of the brake installation 400 of FIGURES 23 to 25 inclusive, is generally the same and differs only in minor respects in these different modifications. Considering the construction shown in the rear wheel installation of FIGURES 1 to 15 inclusive, let it be assumed that the hydraulic pressure fluid supply pipe 260 is connected to the master cylinder of a conventional hydraulic brake operating system, and that the operator depresses the pedal thereof either to actuate the master cylinder directly or through a conventional power-assisted mechanism or servo-mechanism.

When the brake pedal is so operated, hydraulic pressure fluid passes through the flexible pipe 260 and the port 256 into the rearward end of the hydraulic cylinder 230 (FIGURE 1), acting against the resilient cup-shaped member 242 of the piston head 240 so as to force the latter and its connected rod 208 and fan-shaped motion-transmitting member 202 to the left. The leftward motion of the fan-shaped member 202 acting against the thrust arm or forward bracket 182 moves the forward or slave brake shoe unit 120 to the left so as to force the brake lining 138 thereof into frictional braking engagement with the forward annular brake disc 86. The friction thus arising causes the slave brake shoe unit 120 and bracket 182 to be pulled ahead of the rearward or master brake shoe unit 122, swinging the fan-shaped member 202 to the left, as shown by the dotted lines in FIGURES 7 and 12, thereby causing the ball seats 174 and 176 to move circumferentially out of alignment with one another. This action causes the balls 178 to roll up on the ball seats 174 and 176, now out of line, thereby forcing the master or rearward brake shoe unit 122 to move rearwardly (FIGURES 1 and 12) on the rollers 158 at its opposite ends into frictional engagement with the rearward annular brake disc 104.

As the master brake shoe unit 122 thus moves rearwardly (to the right in FIGURE 1), it is restrained from circumferential motion by the rollers 158 at its opposite ends, caged in the Z-shaped members 152 and 164 shown in FIGURES 3 and 4. The rolling action is supported by the wear or bearing bars 154 and 160 (FIGURE 3) limited by their projections 156 and 162. In the case of the modification shown in FIGURE 5, in addition to the rolling action of the roller 158, there is also a rolling action as the roller 158 rolls downhill along the inclined surfaces 165 and 171. The braking torque is transmitted through the rearward bracket 220 to the flanged plate 54 and thence to the rear axle housing 48 to which it is attached.

The same braking action occurs in the front wheel brake installation of FIGURE 16 and also in the use of the one-piece brake lining supporting members 332 and 334 of FIGURES 17 to 22 inclusive. The same braking action occurs in the modified brake installation 400 of FIGURES 23 to 26 inclusive, with the exception of the fact that the rearward brake lining supporting member 126 of the rearward brake shoe unit 401 slides back and forth on its tubular bearing stem 428 rather than rolling back and forth on the rollers 158 of FIGURE 2, and the associated mechanism shown in connection therewith in FIGURES 2, 3 and 4.

In any of the above-described forms of the invention, when the operator moves his foot from the brake pedal or relaxes his foot pressure thereon, the hydraulic pressure within the hydraulic cylinder 230 is relieved, whereupon the tension springs 146 (FIGURES 1 and 6) pull the forward and rearward brake shoe units 120 and 122 toward one another, disengaging their respective brake linings 138 and 140 from the forward and rearward annular brake discs 86 and 104 respectively.

The heat developed by the frictional engagement of the brake shoes with their respective brake discs in the brake installations 30 and 400 of the present invention, by acting only upon a fractional part of the axially widely separated brake discs 86 and 104, and then only on one side thereof, divides the heat generation between the two separated brake discs 86 and 104, leaving the remainder of each disc and its outer surface for heat dissipation. The efficient heat dissipation action resulting from this construction, due to the fact that the segmental brake shoes extend over only about one-third of the circumference of each brake disc, gives a higher braking efficiency with a substantial elimination of brake fade arising from the thermal expansion of the brake drums of ordinary brakes radially away from their respective brake shoes under high speed or mountainous driving conditions. This results in turn from the fact that each third of the brake disc frictionally engaged by the brake lining is immediately rotated out into the open air to be cooled. This action consequently maintains the temperatures of the brake shoes, brake linings and brake discs at much lower levels than in conventional brakes where the major part of the circumference of the brake drum or disc is simultaneously engaged by the brake shoes, and where, in certain disc brakes, both sides of the brake disc are simultaneously engaged by oppositely-acting brake shoes moving toward one another.

In practice, it has been found that the segmental brake shoes of the present invention are preferably about one-third or 120 degrees in circumferential extent so that all the braking work is done on approximately one-third of the area of the disc, the remaining two-thirds or approximately 240 degrees thereof being simultaneously exposed to the open air for cooling. Since a high temperature differential thereby occurs between the portion of each brake disc being braked and the portion being cooled, a very good heat dissipation occurs, and the temperatures of the brake shoes are therefore kept low. The limiting circumferential extents of the segmental brake shoes according to the applicant's invention have been found to lie between approximately one-quarter of the circumference and approximately one-half thereof, namely between 90 and 180 degrees circumferential extent, with the preferred extent being approximately 120 degrees, as stated above.

If the segmental brake shoes occupy less than 90° of circumferential extent of the brake disc, the unit pressure required to accomplish the necessary braking exceeds the heat resistance of the best composition brake lining, with consequent damage thereto or destruction thereof, and the temperature becomes too great even during short braking periods, and exceeds a critical point. If, on the other hand, the circumferential extent of the segmental brake shoes becomes greater than 180°, there is insufficient exposed area of the brake disc to accomplish sufficient cooling in the half revolution affording cooling, with the result that the increase of the base temperature rises so high that over a short period of time the total temperature also exceeds the critical point for the brake lining. Cooling of the applicant's brake installation 30 or 400 is further enhanced by the circulation of air through the interior thereof aided by the fins or deflectors 76 and 78 (FIGURES 2 and 23).

Moreover, the brake installation 30 or 400 of the present invention is enabled to use but a single hydraulic cylinder to engage the slave brake shoe disc and move circumferentially, the master brake shoe being actuated by the servo action described above by reason of the wedging action of the balls 178 arising from the circumferential displacement of their ball seats.

Figures 11, 12:
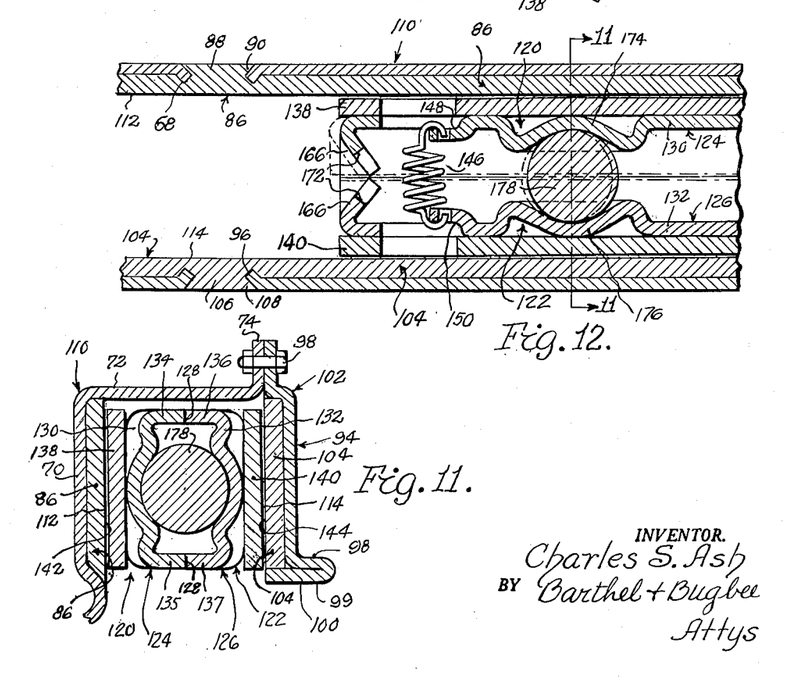
FIGURE 11 is a cross-section taken along the line 11—11 in FIGURE 2.
FIGURE 12 is a fragmentary approximately vertical section taken along the arcuate line 12—12 in FIGURE 2.

Furthermore, the brake installation 30 or 400 of the present invention also has the additional advantage of providing an automatic take-up to compensate for wear in the brake lining. As seen in FIGURES 7 and 12, when the rod 208 is reciprocated to apply the brake, either by the hydraulic cylinder 226 or by the manually-operated lever 278, the motion thereof is transmitted through the fan-shaped member 202 to the bracket 182 attached to the slave brake shoe 120 (FIGURE 12), moving the brake lining 138 of the latter into frictional engagement with the surface 112 of the brake disc 110. As the clearance between a new brake lining 138 and the brake disc surface 112 is very slight, namely approximately of the order of $\frac{1}{64}$ of an inch, only a very slight motion of the rod 208 and fan-shaped member 202 is required to engage the brake lining 138 with the brake disc 110 and consequently to shift the slave brake shoe 120 circumferentially as shown in the dotted lines on the left-hand side of FIGURE 12, as described above. The consequent shifting of the ball 178 to the left, as also shown by the dotted lines in FIGURE 12, and the resulting misalignment of the ball seats 174 and 176 because of the inability of the master brake shoe 122 to move circumferentially, causes the brake lining 140 of the latter to be pushed against the braking surface 114 of the brake disc 104 by the camming action resulting from the ball 178 riding up on the sides of the ball seats 174 and 176.

If, now, the brake linings 138 and 140 wear considerably, as over an extended period of use, the clearances between them and their respective braking surfaces 112 and 114 become considerably greater, with a consequently greater travel required for the brake shoes 120 and 122. The circumferential shifting of the bracket 182 on the slave brake shoe 120 causes a swinging of the fan-shaped member 202 by reason of the mounting of its spherical end 204 in the spherical socket 206, as shown by the dotted lines in FIGURE 7, the arcuate outer end being a circular arc centered at the center of the ball portion 204. As a consequence, the arcuate end 200 rolls relatively to the arcuate inner surface 198 of the bracket 182, pushing the bracket 182 transversely by the engagement of the "heel" portion of the fan-shaped member 202, namely the right-hand portion of its outer end surface 200 (FIGURE 7), with the inner surface 198 of the bracket 182, so that the latter moves not only circumferentially but also a greater distance axially. The greater is the wear on the brake linings 138 and 140, the greater is the relative movement, both axially and circumferentially, between the slave and master brake shoes 120 and 122, and the wider is the swinging of the fan-shaped member 202. As a result, the fan-shaped member 202 swings circumferentially and its heel portion at its end 200 rides up on the surface 198 to take up brake lining wear automatically. The sensation experienced in the sole of the foot upon depressing the brake pedal with the present brake is the feeling of backing up of the brake pedal slightly after applying the brake, due to the action of the fan-shaped motion-transmitting member 202 and the rolling up of the balls 178 on the opposite sides of their temporarily circumferentially-displaced ball seats 174 and 176.

The provision of only two balls 178 for operatively interconnecting the slave and master brake shoes 120 and 122 imparts to them a floating and self-aligning action which would not be present with a greater number of balls. This construction also proportions the braking loads equally between both balls and consequently between both ends of the brake shoes, as well as rendering the brake shoes self-aligning in all directions. This construction also simplifies manufacturing under mass production conditions and reduces cost by requiring less precision of workmanship, where three or more balls require careful machining and lining up in order that each ball will bear its proper proportion of the load.

The brake installation of the present invention, unlike many so-called "power brakes" which are actually only regular brakes equipped with a booster device, is a genuine power brake in that its construction provides power built into the brake itself, this power being created by the balls 178 rolling up the ramps formed by the concave seats 174 and 176. The power applied in this manner can be governed by regulating the angles of these ramps, so that a more powerful action can be provided for the front brakes than for the rear brakes by providing a flatter ramp angle for the front brakes than for the rear brakes. This is in accordance with the preference of some automotive engineers for having more powerful brakes on the front wheels than on the rear wheels because the stopping motion of the vehicle creates a tendency for it to surge forward and thus tend to shift the center of gravity in a forward direction. By the present invention, these booster devices of prior brakes can, if desired, be eliminated for the above reasons.

*Modified brake discs with radial cooling ribs as fasteners*

FIGURES 27, 28 and 29 show a double annular brake disc unit, generally designated 440, generally similar to that shown at 110 in the upper and lower portions of FIGURE 16 but employing different means for securing the parts together. The generally annular brake supporting member 442 is also similar to the brake supporting plate 64 of FIGURE 16 as regards its central portion, in that it has a central hole 344 for the reception of the hub 66 and circumferentially-spaced multiple holes 446 for the wheel-securing studs 326. The supporting plate 442 has an annular indented rib 448 and an annular radial peripheral portion 450 provided with circumferentially-spaced multiple radial slots 452 (FIGURE 28). Beyond the annular radial portion 450, the supporting plate 442 terminates with an approximately toroidal axial peripheral wall 454 provided at intervals with struck-up air scoops 456 forming air inlet ports 458 for cooling the internal mechanism. The peripheral portion 454 terminates in an outwardly-projecting annular radial flange 460 which is bolted as at 462 to the corresponding radial flange 464 of a brake disc supporting ring 466 likewise provided with multiple circumferentially-spaced radial slots 468. The ring 466 at its inner edge is provided with a doubled reversely-bent axial flange 470.

Mounted, as by casting molten metal into the radial peripheral portions of the supporting plate 442 and supporting ring 466 respectively are annular brake discs 472 and 474 respectively, each having circumferentially-spaced radial ribs 476 or 478 projecting respectively through the radial slots 452 and 468 and enlarged beyond the slots to form combined fastening and cooling fins 476 or 478 (FIGURE 29).

The installation and operation of the modified double annular brake disc unit 440 shown in FIGURE 27 is generally similar to that of the double annular brake disc unit 110 shown in FIGURE 16 and employs a similar double segmental brake shoe assembly 118, omitted from FIGURE 27 to simplify the drawing. The casting of the brake discs 472 and 474 into their respective supporting members 442 and 466 with their radial ribs 476 and 478 projecting through their respective radial slots 452 and 468 provides not only an integral construction but also fastening ribs 476 and 478 which also serve as cooling fins for carrying away the heat conducted to them from the brake discs 472 and 474. This heat, as stated above, of course arises from the energy dissipated as a result of the frictional engagement of the segmental brake shoes 120 and 122 therewith (FIGURE 16). In other respects, the operation of the modified double annular brake disc unit 440 is substantially the same as that of the unit 110 of FIGURE 17 and hence requires no further description.

*Non-self-energizing segmental-shoe disc brake*

Figures 30, 31, 32, 33, 34, 35:
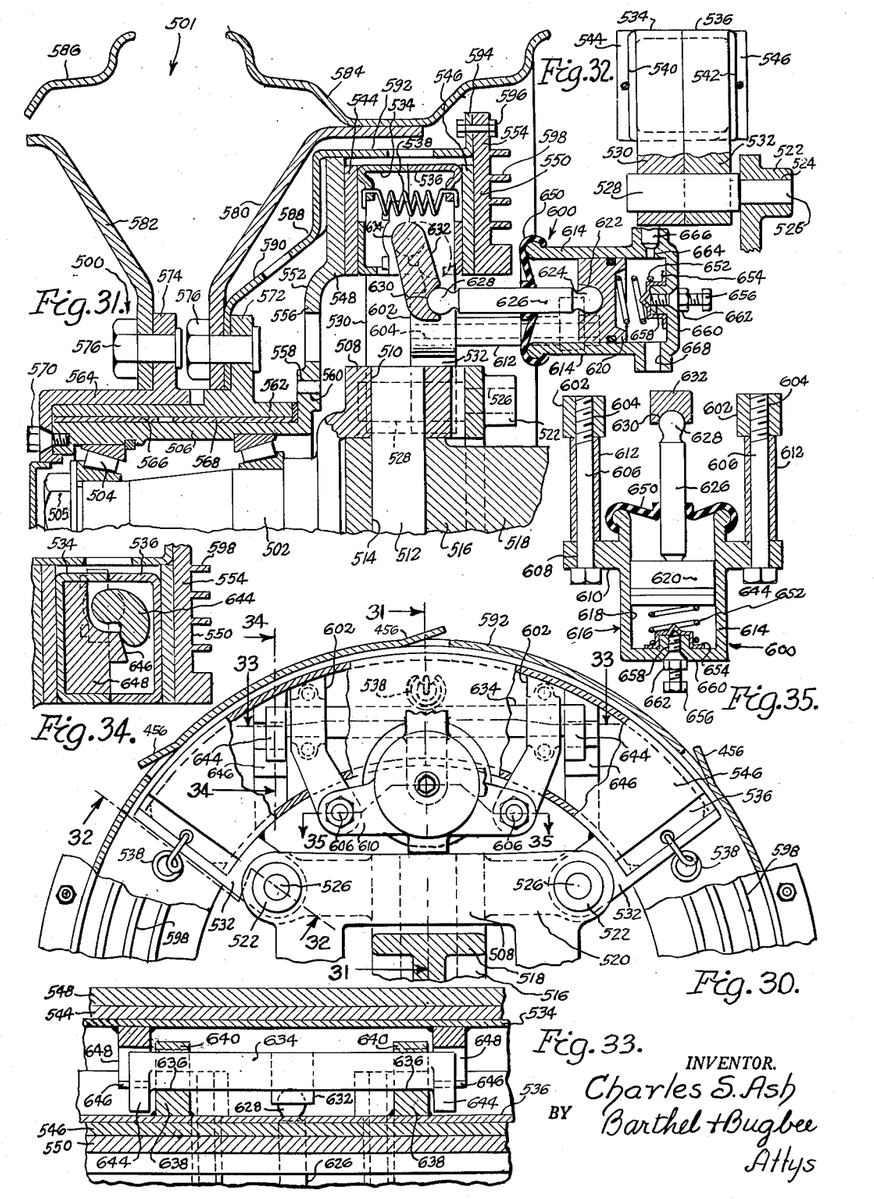
FIGURE 30 is a fragmentary side elevation, partly in section, of a non self-energizing disc brake according to a further modification of the invention.
FIGURE 31 is a fragmentary vertical section taken along the line 31—31 in FIGURE 30, showing the brake applied to steered dual front wheels.
FIGURE 32 is a fragmentary end elevation, partly in section, of the brake shoe assembly used in the brake of FIGURES 30 and 31, taken along the line 32—32 in FIGURE 30.
FIGURE 33 is a fragmentary horizontal section taken along the line 33—33 in FIGURE 30, showing the cam shaft and brake-actuating cams.
FIGURE 34 is a fragmentary vertical section taken along the line 34—34 in FIGURE 30.
FIGURE 35 is a fragmentary horizontal section taken along the line 35—35 in FIGURE 30, and showing details of the reciprocatory fluid pressure brake-operating motor.

The further modified non-self-energizing segmental-shoe disc brake and wheel unit, generally designated 500, shown in FIGURES 30 to 35 inclusive, is illustrated as applied to a steered dual front wheel assembly 501 mounted on the front axle spindle 502 by means of opposed tapered roller bearing units 504 held in place by a spindle nut 505 and rotatably supporting a sleeve 506 (FIGURE 31). Integral with the spindle 502 is a steering knuckle 508 (FIGURES 30 and 31) bored as at 510 to receive a kingpin 512 which in turn is mounted in a bore 514 in the enlarged end portion 516 of a front axle 518. Projecting laterally from the steering knuckle 508 are arms 520 integral therewith. The arms 520 at their outer ends are provided with bosses 522 (FIGURES 30 and 32) bored at 524 to receive the reduced diameter end portions 526 of laterally-spaced brake shoe supporting pins 528 adapted to relatively slidably support the opposite radial end portions 530 and 532 of hollow segmental-arcuate brake shoes 534 and 536 respectively.

The brake shoes 534 and 536 are of channel cross-section (FIGURE 34) with their channels facing one another and are drilled in alignment to receive the opposite ends of tension springs 538 urging them toward one another. Secured in any suitable manner to the outer surfaces 540 and 542 of the brake shoes 534 and 536 are brake linings 544 and 546 respectively engageable with the annular braking portions 548 and 550 of outer and inner brake discs 552 and 554 respectively. The brake disc 552 has a radially-extending central portion 556 which is splined or otherwise drivingly secured at 558 to the correspondingly-splined flange 560 of the sleeve 506.

Coaxial with and surrounding the sleeve 506 are telescoping inner and outer wheel hubs 562 and 564 respectively separated therefrom by bushings 566 and 568. The inner hub 562 rests against the flange 560 and in turn is held in position by the flanged outer end of the outer hub 564 which in turn is bolted at 570 to the end of the sleeve 506. The inner and outer hubs 562 and 564 are provided intermediate their ends with outwardly-extending radial flanges 572 and 574 respectively to which are bolted as at 576 and 578 the oppositely-dished inner and outer wheels 580 and 582 carrying inner and outer tire rims 584 and 586 secured thereto in any conventional manner, as by welding. The invention is not confined to the steered dual front wheel assembly 501 shown in FIGURE 31 as it may be equally well applied to the single wheel construction shown in FIGURE 16.

Also bolted to the external flange 572 of the inner hub 562 is a disc-shaped brake-supporting member 588 which is dished at 590 in its central portion and provided at its periphery with an axial cylindrical portion 592 which terminates in an outwardly-projecting radial flange 594. The latter is bolted as at 596 (FIGURE 31) to the inner brake disc 554 which is provided with cooling fins 598 to dissipate more effectively the heat developed during the braking operation.

Brake-actuating mechanism, generally designated 600, is provided for forcing the brake shoes 534 and 536 and their respective brake linings 544 and 546 apart from one another into engagement with their corresponding brake disc portions 548 and 550. This mechanism 600 includes a pair of bent arms 602 secured at their upper ends to the inner brake shoe 536 and bored and threaded at 604 at their lower ends (FIGURES 21 and 35) to receive the threaded ends of elongated parallel bolts 606, the shanks of which pass through bores 608 in a cross head 610 and also through tubular spacers 612.

The cross head 610 (FIGURE 35) supports the hydraulic cylinder 614 of a reciprocatory hydraulic motor 616 having a bore 618 in which a piston head 620 is reciprocably mounted. The piston head 620 has a spherical socket 622 (FIGURE 35) which receives the ball end 624 of a piston rod 626, the opposite ball end 628 of which engages a ball seat 630 in the lower end of a crank arm 632. The upper end of the crank arm 632 is integral with and depends from the mid-portion of a cam shaft 634 (FIGURE 33), the opposite end portions of which are journaled in aligned bearing bores 636 in bearing brackets 638 welded or otherwise secured at their inner ends to the vertical wall of the inner brake shoe 536, substantially equidistant from the midpoint of the brake shoe 536. The cam shaft 634 is held in position by bearing caps 640 bolted or otherwise secured thereto as at 642 (FIGURE 30). Mounted on the outer ends of the cam shaft 634 substantially equidistant from the midpoint thereof are depending integral cam arms 644, the rounded ends of which are engageable with the cam abutments 646 on abutment blocks 648 (FIGURES 30, 33 and 34) which are welded or otherwise secured to the outer brake shoe 534 in laterally-spaced relationship.

The forward end of the hydraulic cylinder 614 is closed by an apertured cylinder head 650 (FIGURES 31 and 35) through which the piston rod 626 passes and for that purpose preferably made of resilient material, such as natural or synthetic rubber or synthetic plastic in order to adapt itself to the swinging of the piston rod 626 as it reciprocates. The piston head 620 is urged in a forward direction by a compression spring 652 (FIGURES 31 and 35), the rearward end of which engages a cupped spring abutment 654 which is adjustably movable by means of an adjustment screw 656 threaded through a threaded hole 658 in the cylinder end wall 660 and locked in position by a lock nut 662. The upper side of the hydraulic cylinder 614 is provided with an air release port 664 (FIGURE 31) closed by a screw plug 666 for the purpose of draining out air from the hydraulic braking system. The cylinder 614 is finally provided with a pressure fluid supply port 668 (FIGURE 31) near the end wall 660, the port 668 being connected to a conventional source of hydraulic brake-operating pressure fluid through a conventional conduit and valve system operated by the usual foot brake pedal (not shown).

In the operation of the further modified brake shoe and wheel unit 500 of FIGURES 30 to 35 inclusive, let it be assumed that the pressure fluid supply port 668 has been connected to a conventional brake operating hydraulic circuit controlled by the usual foot brake pedal and that while the vehicle is in operation, the operator has depressed the foot pedal to admit hydraulic pressure fluid to the port 668 of the hydraulic cylinder 614 of the reciprocatory motor 616. This action moves the piston head 620 and piston rod 626 forward or to the left in FIGURE 31, swinging the crank arm 632, cam shaft 634 and cam arms 644 in clockwise direction. This action simultaneously causes the abutment block 648 and outer brake shoe 534 to be pushed outward, or to the left in FIGURES 31 and 34, while the reaction therefrom upon the bearing brackets 638 causes the inner brake shoe 536 to be pushed inward through the connection between the inner brake shoe 536 and the hydraulic cylinder 614 by way of the bolts 606 and cross head 610. As a result of this action, the brake linings 544 and 546 of the brake shoes 534 and 536 are firmly pressed into engagement with their respective brake disc portion 548 and 554, retarding or halting rotation of the wheels 580 and 582 through their interconnection at the splined joint 558, 560 (FIGURE 31) near the inner end of the sleeve 506. The positioning of the crank arm 632 and piston rod 626 at the midpoints of the brake shoes 534 and 536 and the positioning of the cam arms 644 and bearing brackets 638 equidistant therefrom give an even application of pressure upon the brake shoes 534 and 536 and thence upon the brake disc portions 548 and 554.

The heat generated as a result of the friction occurring during braking is dissipated partly by conduction and partly by radiation, assisted by the cooling fins 598 on the brake disc 550 (FIGURES 31 and 34). The fact that the brake shoes 534 and 536 at any given instant engage only about one-third of the engageable surface of their respective brake discs 548 and 550 causes the remaining two-thirds thereof to be subjected to cooling air at any given instant, and therefore increasing the braking efficiency of the invention.

When the operator releases his brake foot pedal, so as no longer to supply pressure fluid to the port 668, the fluid released from the cylinder 614 passes outward through the port 668 into the connecting conduit, ready to re-enter at the next depression of the brake pedal by the operator. By this superior cooling arrangement, the invention substantially eliminates brake fade, together with the fact that any thermal expansion or contraction does not withdraw either brake shoe from its respective brake disc, as in the case of expanding band or shoe and drum brakes.

What I claim is:

1. A double-disc brake for installation between a rotary vehicle wheel and a stationary vehicle wheel axle mount, said brake comprising a brake disc support adapted to be rotatably connected to the vehicle wheel, first and second brake discs mounted on said support in axially-spaced relationship and having axially-spaced parallel inner braking surfaces facing one another, first and second segment-shaped brake shoes mounted in axially-spaced relationship in the space between said brake discs for axial motion into and out of engagement with said braking surfaces, each brake shoe having a circumferential length of less than a semi-circle and having a radially-directed side wall with a brake-disc-engaging surface thereon, means connected to said mount for restraining one of said brake shoes against circumferential motion while effecting axial braking motion thereof, said means including transversely-spaced generally rectilinear guideways disposed between said one brake shoe and said mount in a generally axial direction, and rollably anti-friction elements interposed between said guide-ways and mechanism engageable with said brake shoes for urging said brake shoes axially in opposite directions into braking engagement with said braking surfaces of said brake discs.

2. A double-disc brake for installation between a rotary vehicle wheel and a stationary vehicle wheel axle mount, said brake comprising a brake disc support adapted to be rotatably connected to the vehicle wheel, first and second brake discs mounted on said support in axially-spaced relationship and having axially-spaced parallel inner braking surfaces facing one another, first and second segment-shaped brake shoes mounted in axially-spaced relationship in the space between said brake discs for axial motion into and out of engagement with said braking surfaces, each brake shoe having a circumferential length of less than a semi-circle and having a radially-directed side wall with a brake-disc-engaging surface thereon, means connected to said mount for restraining one of said brake shoes against circumferential motion while effecting axial braking motion thereof, said means including transversely-spaced generally rectilinear guideways disposed between said one brake shoe and said mount in a generally axial direction, and rollably anti-friction elements interposed between said guide-ways said guideways and said rollable elements being disposed at opposite ends of said segment-shaped brake shoes, said guideways and said rollable elements being disposed at opposite ends of said one brake shoe and mechanism engageable with said brake shoes for urging said brake shoes axially in opposite directions into braking engagement with said braking surfaces of said brake discs.

3. A double-disc brake for installation between a rotary vehicle wheel and a stationary vehicle wheel axle mount, said brake comprising a brake disc support adapted to be rotatably connected to the vehicle wheel, first and second brake discs mounted on said support in axially-spaced relationship and having axially-spaced parallel inner braking surfaces facing one another, first and second segment-shaped brake shoes mounted in axially-spaced relationship in the space between said brake discs for axial motion into and out of engagement with said braking surfaces, each brake shoe having a circumferential length of less than a semicircle and having a radially-directed side wall with a brake-disc-engaging surface thereon, means connected to said mount for restraining one of said brake shoes against circumferential motion while effecting axial braking motion thereof, said means including transversely-spaced generally rectilinear guideways disposed between said one brake shoe and said mount and having guide surfaces inclined at acute angles to the axis of rotation of said brake disc, and rollable anti-friction elements interposed between said guideway and mechanism engageable with said brake shoes for urging said brake shoes axially in opposite directions into braking engagement with said braking surfaces of said brake discs.

4. A double-disc brake for installation between a rotary vehicle wheel and a stationary vehicle wheel axle mount, said brake comprising a brake disc support adapted to be rotatably connected to the vehicle wheel, first and second brake discs mounted on said support in axially-spaced relationship and having axially-spaced parallel inner braking surfaces facing one another, first and second segment-shaped brake shoes mounted in axially-spaced relationship in the space between said brake discs for axial motion into and out of engagement with said braking surfaces, each brake shoe having a circumferential length of less than a semi-circle and having a radially-directed side wall with a brake-disc-engaging surface thereon, means connected to said mount for restraining one of said brake shoes against circumferential motion while effecting axial braking motion thereof, means supporting the other brake shoe for motion both axially and circumferentially relatively to said one brake shoe, said means including transversely-spaced generally rectilinear guideways disposed between said one brake shoe and said mount in a generally axial direction, and rollably anti-friction elements interposed between said guideways and mechanism engageable with said brake shoes for urging said brake shoes axially in opposite directions into braking engagement with said braking surfaces of said brake discs.

5. A double-disc brake for installation between a rotary vehicle wheel and a stationary vehicle wheel axle mount, said brake comprising a brake disc support adapted to be rotatably connected to the vehicle wheel, first and second brake discs mounted on said support in axially-spaced relationship and having axially-spaced parallel inner braking surfaces facing one another, first and second segment-shaped brake shoes mounted in axially-spaced relationship in the space between said brake discs for axial motion into and out of engagement with said braking surfaces, each brake shoe having a circumferential length of less than a semi-circle and having a radially-directed side wall with a brake-disc-engaging surface thereon, means connected to said mount for restraining one of said brake shoes against circumferential motion while effecting axial braking motion thereof, the other brake shoe being movable both axially and circumferentially relatively to said one brake shoe, said means including transversely-spaced generally rectilinear guideways disposed between said one brake shoe and said mount in a generally axial direction, and rollably anti-friction elements interposed between said guideways a brake shoe expanding device disposed between and operatively interconnecting said brake shoes, and mechanism engageable with one of said brake shoes for urging said one brake shoe axially into braking engagement with the braking surface of one of said brake discs, said expanding device moving the other brake shoe axially into braking engagement with the braking surface of the other brake disc.

6. A double-disc brake for installation between a rotary vehicle wheel and a stationary vehicle wheel axle mount, said brake comprising a brake disc support adapted to be rotatably connected to the vehicle wheel, first and second brake discs mounted on said support in axially-spaced relationship and having axially-spaced parallel inner braking surfaces facing one another, first and second segment-shaped brake shoes mounted in axially-spaced relationship in the space between said brake discs for axial motion into and out of engagement with said braking surfaces, each brake shoe having a circumferential length of less than a semi-circle and having a radially-directed side wall with a brake-disc-engaging surface thereon, means connected to said mount for restraining one of said brake shoes against circumferential motion while effecting axial braking motion thereof, the other brake shoe being movable both axially and circumferentially relatively to said one brake shoe, said means including transversely-spaced generally rectilinear guideways disposed between said one brake shoe and said mount in a generally axial direction, and rollably anti-friction elements interposed between said guideways a brake shoe expanding device disposed between and operatively interconnecting said brake shoes, and mechanism engageable with one of said brake shoes for urging said one brake shoe axially into braking engagement with the braking surface of one of said brake discs, said expanding device being constructed and arranged to move the other brake shoe axially into braking engagement with the braking surface of the other brake disc while permitting motion thereof circumferentially relatively to said one brake shoe.

7. A double-disc brake for installation between a rotary vehicle wheel and a stationary vehicle wheel axle mount, said brake comprising a brake disc support adapted to be rotatably connected to the vehicle wheel, first and second brake discs mounted on said support in axially-spaced relationship and having axially-spaced parallel inner braking surfaces facing one another, first and second segment-shaped brake shoes mounted in axially-spaced relationship in the space between said brake discs for axial motion into and out of engagement with said braking surfaces, each brake shoe having a circumferential length of less than a semi-cicle and having a radially-directed side wall with a brake-disc-engaging surface thereon, means connected to said mount for restraining one of said brake shoes against circumferential motion while effecting axial braking motion thereof, the other brake shoe being movable both axially and circumferentially relatively to said one brake shoe, said means including transversely-spaced generally rectilinear guideways disposed between said one brake shoe and said mount in a generally axial direction, and rollably anti-friction elements interposed between said guideways a brake shoe expanding device disposed between and operatively interconnecting said brake shoes, and mechanism engageable with one of said brake shoes for urging said one brake shoe axially into braking engagement with the braking surface of one of said brake discs, said expanding device being constructed and arranged to move the other brake shoe axially into braking engagement with the braking surface of the other brake disc while permitting motion thereof circumferentially relatively to said one brake shoe in response to the braking engagement of said one brake shoe with said one brake disc.

References Cited in the file of this patent

UNITED STATES PATENTS

| 2,173,591 | Miller et al. | Sept. 19, 1939 |
| 2,242,049 | Ash | May 13, 1941 |
| 2,251,539 | Ash | Aug. 5, 1941 |
| 2,256,725 | Pierce et al. | Sept. 23, 1941 |
| 2,669,326 | Kniepkamp | Feb. 16, 1954 |
| 2,679,303 | Wright et al. | May 25, 1954 |
| 2,732,036 | Myers | Jan. 24, 1956 |
| 2,848,072 | Stacy | Aug. 19, 1958 |
| 2,868,335 | Panhard | Jan. 13, 1959 |

FOREIGN PATENTS

| 599,541 | Great Britain | Mar. 15, 1948 |

OTHER REFERENCES

Publication: Klaue, German application Serial No. K20,863, August 23, 1956.